United States Patent Office 3,322,742
Patented May 30, 1967

3,322,742
POLYMERIZATION OF α-CYANOSTYRENE USING ANIONIC CATALYSTS
Eli Perry, Raleigh, N.C., assignor to Monsanto Company, a corporation of Delaware
No Drawing. Filed Dec. 26, 1963, Ser. No. 333,665
4 Claims. (Cl. 260—88.7)

The present invention relates to a method for polymerizing α-cyanostyrene. More particularly it relates to a method for polymerizing α-cyanostyrene by means of anionic catalysts.

Methods for preparing the compound here called α-cyanostyrene, but also termed atroponitrile and α-phenylacrylonitrile, are known. In U.S. Patent 2,362,049, for example, a method is described for preparing this compound by treating acetophenone with hydrogen cyanide, acetylating the acetophenone cyanohydrin so formed and then decomposing the acetophenone cyanohydrin acetate to remove acetic acid and obtain the α-phenylacrylonitrile. Another method involves reacting phenylacetonitrile (benzyl cyanide) with formaldehyde in the presence of a strong alkaline catalyst such as sodium or potassium hydroxide and pyrolyzing the viscous condensation product by vaporization under vacuum. It is known that the product of these reactions, α-cyanostyrene, is a monomer which dimerizes rapidly to a colorless crystalline compound which is stable over long periods of time without being subject to further polymerization. It is also known that a α-cyanostyrene interpolymerizes readily with other monomers such as butadiene-1,3,isoprene, dimethylbutadiene-1,3, and, in general, conjugated hydrocarbons butadienes to give plastic masses, some of which have rubber-like properties. This interpolymerization is usually effected by emulsion polymerization in aqueous solution containing an emulsifying agent, a free-radical initiator, and a buffer in addition to the monomers. However, up to the present time, no suitable method has been known for obtaining homopolymers of α-cyanostyrene having a molecular weight higher than the dimer. The use of free-radical-generating catalysts yields only polymers of very low molecular weight at impractically low rates of polymerization.

It is an object of the present invention, therefore, to provide a process for the homopolymerization of α-cyanostyrene to polymers of relatively high molecular weight. Other objects and advantages of the invention will become apparent to one skilled in the art from a consideration of the following description of the invention together with the appended claims.

According to the invention, α-cyanostyrene is polymerized by contacting it in a solvent medium or diluent with a minor amount of an anionic catalyst or initiator. The rate of polymerization with an anionic catalyst is extremely rapid, conversion to polymer is high, and the homopolymers produced exceed in molecular weight any heretofore known in the art. The polymeric products of the invention may be described as polymers of moderate molecular weight, i.e., having number average molecular weights ($\overline{M}_n$) above 1,000. The utility of the polymer products will vary depending upon their physical characteristics. The soluble polymers of lower molecular weight which can be produced may be used as dispersing agents after hydrolysis or as indicators for hydrogen ion concentration. The insoluble and infusible polymers of the invention can be hydrolyzed to provide ion exchange resins useful at high temperatures. The polymers of intermediate molecular weight are useful in molding powders, as fibers, and in film form.

Polymerization is effected by merely bringing the monomer into contact with the anionic catalyst at ambient temperatures with the exclusion of moisture and other compounds which have active hydrogen atoms. Suitable catalysts include, for example, tributyl phosphine, tetrakisdimethylaminotitanium, sodium alkoxide, aluminum alkoxide, zinc alkoxide, titanium alkoxide, triisobutyl aluminum, triphenylmethyl sodium, sodium metal, sodium amide, potassium amide, and the like.

Only small amounts of catalyst are required for the polymerization reaction. In general, amounts from about 0.001 to about 20% by weight of the monomer are employed. For practical purposes, the preferred amount of catalyst or initiator used is in the range from about 0.01 to about 3.0%.

Ordinarily, the polymerization is conducted at temperatures within the range from about 50° C. to about −150° C. Preferred temperatures are those in the range from about 0° C. to about −80° C.

Because of the rapid reaction, the polymerization is carried out in the presence of a diluent or in a solvent medium in order to permit control of the temperature. Toluene is one preferred diluent or solvent medium for the polymerization but other solvents can be employed such as, for example, tetrahydrofuran, tertiary butyl benzene, decahydronaphthalene, diethyl ether, p-dimethylcyclohexane, and the like or mixtures of such solvents.

The invention is illustrated in the following example which, however, is not to be construed as limiting it in any manner whatsoever.

*Example*

A series of polymerization reactions were carried out in a reaction flask fitted with dropping funnels together with inlet and outlet lines for maintaining an inert gas atmosphere throughout the system, and provided with coated magnetic stirring bars. Prior to use, the entire system was dried and purged with inert gas (argon). All material handling and transfer was carried out under inert gas (argon) so as to exclude oxygen, water vapor, and other contaminants. Solvent and α-cyanostyrene were charged to the flask and the flask was immersed in a Dry Ice-triclene bath adjusted to the desired temperature and allowed to cool for about 15 minutes. The catalyst was then introduced by means of a hypodermic syringe while the contents of the flask were agitated thoroughly. The syringe had been dried in an oven at 120° C. and then flushed with a purge gas which had been dried over molecular sieves. Polymerization occurred rapidly so that the contents of the reaction flask became solid usually in less than 30 minutes.

At the end of the desired polymerization period (from about 20 to 22 hours), excess methanol was added to the reaction flask at the reaction temperature to destroy the catalyst. The reaction mixture was then transferred to a tared flask and evacuated at 25° C. at water pump pressure until the bulk of solvent and excess monomer had been evaporated. Further evacuation was effected at 0.001 to 0.005 mm. at room temperature until a constant weight was observed. The polymer was purified by solution in dimethylformamide and reprecipitated in methanol, after which it was dried at 40° C. and a pressure less than 0.1 mm. Hg.

Conversions to polymer under the different conditions employed are presented in Table I below. The properties of the polymers obtained are recorded in Table II.

TABLE I.—CONVERSION OF A-CYANOSTYRENE TO POLYMER

| Run No. | Solvent or Diluent | Monomer Conc. (moles/l.) | Temp., °C. | Catalyst | Catalyst Conc., percent by weight of Monomer | Conv., percent |
|---|---|---|---|---|---|---|
| A | Toluene | 2.3 | −78 | Ti(NMe$_2$)$_4$ [a] | 9.7 | 51 |
| B | Toluene plus THF [c] | 2.3 | −78 | Bu$_3$P [b] | 3.4 | 95 |
| C | Toluene | 2.3 | 0 | Bu$_3$P | 1.4 | 93 |
| D | THF plus Toluene (70–30) | 2.3 | 0 | Ti(NMe$_2$)$_4$ | 2.3 | 78 |
| E | Toluene | 1.32 | −76 | Ti(NMe$_2$)$_4$ | 13.0 | 68 |
| F | do | 1.32 | −76 | n-Bu$_3$P | 3.2 | 96 |
| G | do | 1.32 | −76 | Ti(NMe$_2$)$_4$ | 3.6 | 86 |
| H | do | 1.32 | 0 | Ti(NMe$_2$)$_4$ | 1.6 | 88 |

[a] Tetrakisdimethylaminotitanium.
[b] Tributyl phosphine.
[c] Tetrahydrofuran.

TABLE II.—POLYMER PROPERTIES

| Run No. | Color | Tack Temperature on a Heated Bar (As recovered/purified) (°C.) | [η] 30° C. in DMF [a] | $\overline{M}_n$ [b] |
|---|---|---|---|---|
| A | Off-White | 215/244 | 0.30 | |
| B | Reddish | 241/255 | 0.66 | |
| C | do | >300 | | |
| D | Brown | 268 | | |
| E | White | 245/255 | 0.49 | |
| F | do | 270–280 | 0.36 | 6,000 |
| G | do | 250–260/255 | 0.64 | 10–15,000 |
| H | Light brown | >280 | | |

[a] Dimethylformamide.
[b] Measured with a vapor phase osmometer.

The polymer produced at −78° C. (Runs A and B) and at −76° C. (Runs E, F, G) was fusible and soluble in dimethylformamide, dimethyl sulfoxide, and ethylene carbonate whereas that produced at 0° C. was infusible and insoluble even at temperatures up to 150° C.

What is claimed is:

1. A homopolymer of α-cyanostyrene having a number average molecular weight above 1,000.

2. The method of homopolymerizing α-cyanostyrene which comprises contacting said α-cyanostyrene in a solvent medium at temperatures from about 50° C. to about −150° C. with from about 0.001% to about 20% by weight based on said α-cyanostyrene of a compound chosen from the group consisting of tributyl phosphine and tetrakisdimethylaminotitanium.

3. The method of homopolymerizing α-cyanostyrene which comprises contacting said α-cyanostyrene in toluene as a solvent medium with from about 0.001% to about 20% by weight based on said α-cyanostyrene of tributyl phosphine at a temperature in the range from about 0° C. to about −80° C.

4. The method of homopolymerizing α-cyanostyrene which comprises contacting said α-cyanostyrene in toluene as a solvent medium with from about 0.001% to about 20% by weight based on said α-cyanostyrene of tetrakisdimethylaminotitanium at a temperature in the range from about 0° C. to about −80° C.

References Cited

UNITED STATES PATENTS

| | | | |
|---|---|---|---|
| 2,362,049 | 11/1944 | Clifford et al. | 260—88.7 |
| 2,478,990 | 8/1949 | Walker | 260—88.7 |
| 2,675,372 | 4/1954 | Coover et al. | 260—88.7 |
| 2,841,574 | 7/1958 | Foster | 260—88.7 |

JOSEPH L. SCHOFER, *Primary Examiner.*

DONALD CZAJA, *Examiner.*

H. WONG, *Assistant Examiner.*

UNITED STATES PATENT OFFICE
CERTIFICATE OF CORRECTION

Patent No. 3,322,742                    May 30, 1967

Eli Perry

It is hereby certified that error appears in the above numbered patent requiring correction and that the said Letters Patent should read as corrected below.

Column 3, lines 39 and 40, strike out "1. A homopolymer of $\alpha$-cyanostyrene having a number average molecular weight above 1,000."; line 41, the claim numbered "2" should be renumbered -- 1 --; column 4, line 20, the claim numbered "3" should be renumbered -- 2 --; line 26, the claim numbered "4" should be renumbered -- 3 --; in the heading to the printed specification, line 7, for "4 Claims" read -- 3 Claims --.

Signed and sealed this 26th day of November 1968.

(SEAL)
Attest:

Edward M. Fletcher, Jr.
Attesting Officer

EDWARD J. BRENNER
Commissioner of Patents